(12) United States Patent
Shimizu et al.

(10) Patent No.: US 6,250,724 B1
(45) Date of Patent: *Jun. 26, 2001

(54) BRAKE HYDRAULIC CONTROLLER

(75) Inventors: Shuichi Shimizu; Kazuhiro Ohta; Tsutomu Amano; Masashi Kobayashi, all of Nagano (JP)

(73) Assignee: Nissin Kogyo Co., Ltd., Nagano (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 19 days.

(21) Appl. No.: 08/728,607

(22) Filed: Oct. 10, 1996

(30) Foreign Application Priority Data

Oct. 12, 1995 (JP) .................................................. 7-264027

(51) Int. Cl.[7] ...................................................... B60T 8/36
(52) U.S. Cl. ..................................... 303/119.2; 303/116.4
(58) Field of Search ............................... 303/119.2, 116.4, 303/116.1, 116.2, 113.1; 137/884, 596.17; 251/129.1, 129.15; 277/DIG. 4, 237 A, 901, 47

(56) References Cited

U.S. PATENT DOCUMENTS

| 4,898,360 | 2/1990 | VonHayn et al. | ............... 251/129.01 |
|---|---|---|---|
| 5,127,440 | * 7/1992 | Maas et al. | ............... 303/113.1 X |
| 5,466,055 | * 11/1995 | Schmitt et al. | ............... 303/113.1 X |
| 5,482,362 | * 1/1996 | Robinson | ........................ 303/119.2 |
| 5,634,695 | * 6/1997 | Ohta et al. | ................... 303/116.4 X |

FOREIGN PATENT DOCUMENTS

| WO 94/26568 | * 11/1994 | (DE) | ................................. 303/119.2 |
|---|---|---|---|
| 44 05 918 A1 | 8/1995 | (DE) . | |
| 0 675 030 A2 | 10/1995 | (EP) . | |
| 0 675 030 A3 | 10/1995 | (EP) . | |
| 79970 | 1/1995 | (JP) | ................................. 303/118.1 |

* cited by examiner

*Primary Examiner*—Robert J. Oberleitner
*Assistant Examiner*—Pamela J. Lipka
(74) *Attorney, Agent, or Firm*—McGuireWoods LLP

(57) ABSTRACT

In a brake hydraulic controller for controlling a hydraulic pressure from a master cylinder operative to a wheel brake, the controller includes a base, a normally open electromagnetic valve for connecting the master cylinder and the wheel brake, a reservoir, a normally closed electromagnetic valve for connecting the wheel brake and the reservoir, a return pump for returning hydraulic fluid received from the reservoir to the master cylinder, a damper, and a cover for covering the normally open and closed electromagnetic valves, the reservoir, and the damper with a surface of the cover. The cover includes a seal groove and a sealing member fitted to the seal groove for elastically contacting the surface. The brake hydraulic controller can minimize the number of parts required for waterproofing and reduce the number of manhours required for assembling.

31 Claims, 10 Drawing Sheets

BRAKE HYDRAULIC CONTROLLER

BACKGROUND OF THE INVENTION

The present invention relates to a brake hydraulic controller including normally open electromagnetic valves interposed between a master cylinder and wheel brakes, reservoirs, normally closed electromagnetic valves interposed between the wheel brakes and the reservoirs, return pumps for returning hydraulic fluid from the reservoirs to the master cylinder, dampers interposed between the master cylinders, and a common base which disposes all of the above described elements.

A conventional brake hydraulic controller of this type has already been disclosed in Unexamined Japanese Patent Publication No. Hei. 7-9970. In this brake hydraulic controller, normally opened electromagnetic valves and normally closed electromagnetic valves are mounted on one side of the base, and reservoirs are mounted on another side of the base. A cover having a sealing member is fitted to the base so as to render the normally opened electromagnetic valves and the normally closed electromagnetic valves waterproof and dustproof.

In the above described conventional brake hydraulic controller, the reservoirs are attached to the base with some of them uncovered. The formation of rust on the uncovered portion of the reservoirs resulting from exposure to water is not prevented. It is only necessary to cover the reservoirs with a cover having a sealing member in order to prevent the reservoirs from rusting away. As previously described, the reservoirs are mounted on the side of the base which is different from the side on which the normally closed electromagnetic valves and the normally open electromagnetic valves are mounted. For this reason, it is necessary to cover the reservoirs with another cover, which results in the number of components and the number of manhours to fit a reservoir cover to the base being increased.

SUMMARY OF THE INVENTION

The present invention has been made in view of the conventional problems, and an object of the present invention is to provide a brake hydraulic controller in which a structure for rendering normally opened electromagnetic valves, normally closed electromagnetic valves, reservoirs, and dampers waterproof is formed with a few number of components, and in which the number of manhours needed to assemble the waterproof structure is reduced.

The object of the invention is achieved, according to a first aspect of the present invention, by a brake hydraulic controller for controlling a hydraulic pressure from a master cylinder operative to a wheel brake, in which the controller includes a base, a normally open electromagnetic valve mounted on the base for connecting the master cylinder and the wheel brake, a reservoir mounted on the base, a normally closed electromagnetic valve mounted on the base for connecting the wheel brake and the reservoir, a return pump mounted on the base for returning hydraulic fluid received from the reservoir to the master cylinder, a damper mounted on the base and connected to the master cylinder and the return pump, and a cover attached to the base for covering the normally open and closed electromagnetic valves, the reservoir, and the damper with a surface of the cover, the cover including a seal groove and a sealing member fitted to the seal groove for elastically contacting the surface.

In addition to the elements as described in the first aspect of the present invention, a brake hydraulic controller according to a second aspect of the present invention is characterized by the fact that the cover is made from synthetic resin; the seal grooves are formed in a substantially U-shaped cross section and is made up of an innermost closed surface and a pair of side surfaces connected to both sides of the innermost closed surface substantially at right angles; and the cover includes a reinforcing member which is made of rigid material so as to form at least one of the innermost closed surface and the pair of side surfaces.

In addition to the elements as described in the second aspect of the present invention, a brake hydraulic controller according to a third aspect of the present invention is characterized by the fact that the reinforcing member is embedded in the cover.

In addition to the elements as described in the third aspect of the present invention, a brake hydraulic controller according to a fourth aspect of the present invention is characterized by the fact that a cylindrical portion is integrally formed in the reinforcing member while one end of the cylindrical portion abuts against the surface of the base; and a lock head of a fastening bolt which is screwed to the base through the cylindrical portion is engaged with the other end of the cylindrical portion.

DETAILED DESCRIPTION OF THE PREFERRED EMBODIMENTS

With reference to the accompanying drawings, illustrative embodiments of the present invention will now be described.

Figure 1:
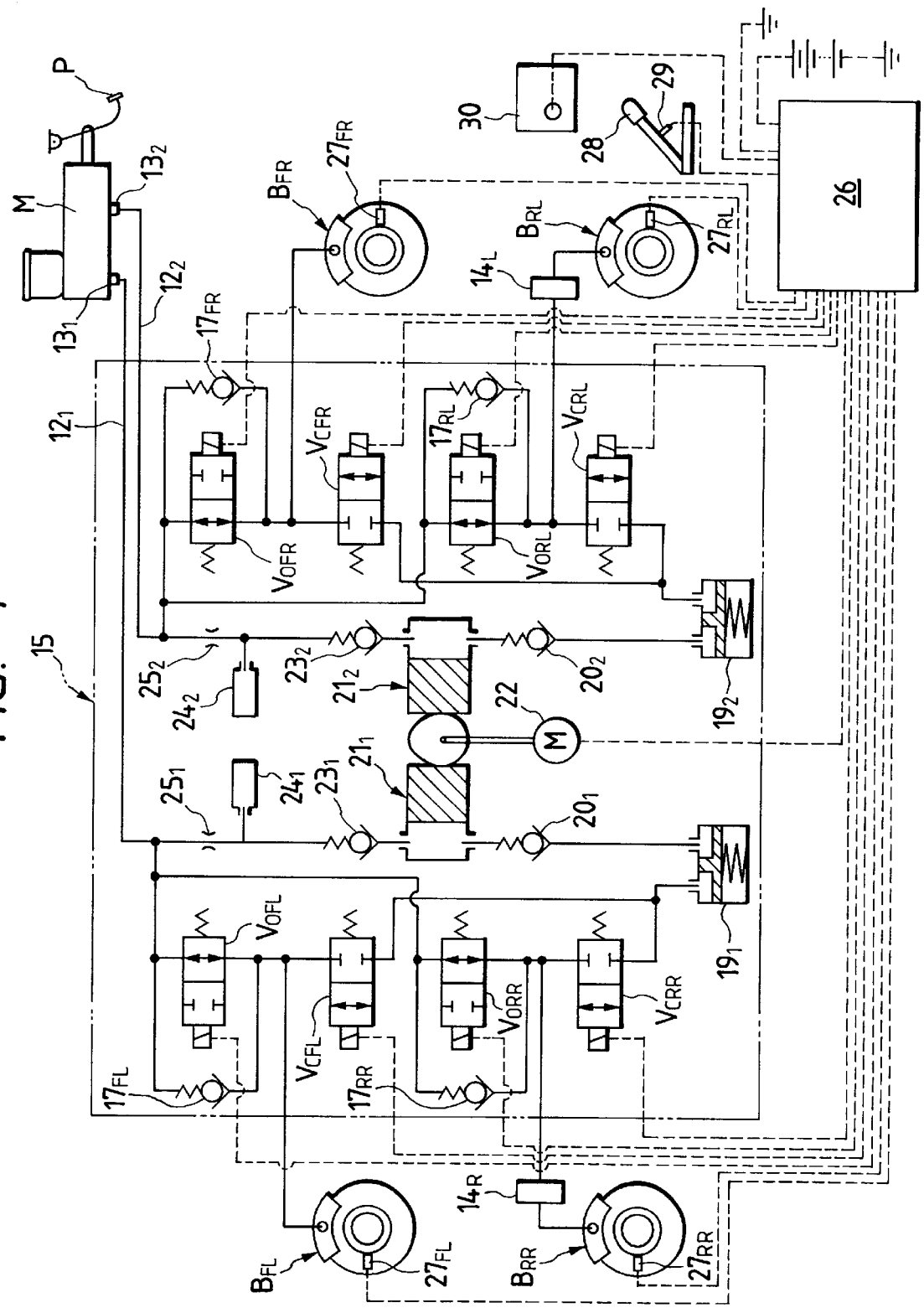
FIG. 1 is a circuit diagram of a hydraulic circuit of a vehicle brake control system according to a first embodiment of the present invention.

FIGS. 1 through 8 show a brake hydraulic controller according to a first embodiment of the present invention. In FIG. 1, a tandem type master cylinder M is equipped with a pair of output ports $13_1$, $13_2$ for producing a hydraulic braking pressure corresponding to the degree of depression of a brake pedal P. A brake hydraulic controller 15 is interposed between a proportional pressure reducing valve $14_R$ connected to a front left wheel brake $B_{FL}$ and a rear right wheel brake $B_{RR}$ and a hydraulic passage $12_1$ connected to the output port $13_1$, and between a proportional pressure reducing valve $14_L$ connected to a front right wheel brake $B_{FR}$ and a rear left wheel brake $B_{RL}$ and a hydraulic passage $12_2$ connected to the output port $13_2$, respectively.

The brake hydraulic controller 15 includes four normally opened electromagnetic valves $V_{OFL}$, $V_{ORR}$, $V_{ORF}$, and $V_{ORL}$ respectively corresponding to the front left wheel brake $B_{FL}$, the rear right wheel brake $B_{RR}$, the front right wheel brake $B_{FR}$, and the rear left wheel brake $B_{RL}$; four check valves $17_{FL}$, $17_{RR}$, $17_{FR}$, and $17_{RL}$ connected in parallel to the normally open electromagnetic valves $V_{OFL}$, $V_{ORR}$, $V_{ORF}$, and $V_{ORL}$; four normally closed electromagnetic valves $V_{CFL}$, $V_{CRR}$, $V_{CRF}$, and $V_{CRL}$ respectively corresponding to the wheel brakes $B_{FL}$, $B_{FR}$, $B_{RL}$, and $B_{RR}$; a pair of reservoirs $19_1$, $19_2$ respectively corresponding to the pair of front left wheel brake $B_{FL}$ and rear right wheel brake $B_{RR}$ and the pair of front right wheel brake $B_{FR}$ and rear left wheel brake $B_{RL}$; a pair of reciprocating plunger pumps $21_1$, $21_2$ connected to the reservoirs $19_1$, $19_2$ via return pumps $20_1$, $20_2$; a single motor 22 shared between the reciprocating plunger pumps $21_1$, $21_2$; a pair of dampers $24_1$, $24_2$ connected to the reciprocating plunger pumps $21_1$, $21_2$ via outlet valves $23_1$, $23_2$; and orifices $25_1$, $25_2$ respectively interposed between the hydraulic passage $12_1$ connected to the output port $13_1$ of the master cylinder M and the dampers $24_1$ and between the hydraulic passage $12_2$ connected to the output port $13_2$ Of the master cylinder M and the damper $24_2$. The demagnetization and excitation of the normally open electromagnetic valves $V_{OFL}$, $V_{ORR}$, $V_{ORF}$, $V_{ORL}$ and the normally closed electromagnetic valves $V_{CFL}$, $V_{CRR}$, $V_{CRF}$, $V_{CRL}$ are switchably controlled by an electronic control unit 26.

The normally open electromagnetic valve $V_{OFL}$ is interposed between the hydraulic passage $12_1$ connected to the output port $13_1$ of the master cylinder M and the front left wheel brake $B_{FL}$; the normally open electromagnetic valve $V_{ORR}$ is interposed between the hydraulic passage $12_1$ and the proportional pressure reducing valve $14_R$ connected to the rear right wheel brake $B_{RR}$; the normally open electromagnetic valve $V_{ORF}$ is interposed between the hydraulic passage $12_2$ connected to the other output port $13_2$ of the master cylinder M and the front right wheel brake $B_{FR}$; and the normally open electromagnetic valve $V_{ORL}$ is interposed between the hydraulic passage $12_2$ and the proportional pressure reducing valve $14_L$ connected to the rear left wheel brake $B_{RL}$. The check valves $17_{FL}$, $17_{RR}$, $17_{FR}$, and $17_{RL}$ are connected in parallel to the normally open electromagnetic valves $V_{OFL}$, $V_{ORR}$, $V_{ORF}$, and $V_{ORL}$ SO as to permit the flow of only hydraulic fluids flowing from the corresponding wheel brakes $B_{FL}$, $B_{FR}$, $B_{RL}$, and $B_{RR}$.

The normally closed electromagnetic valve $V_{CFL}$ is interposed between the front left wheel brake $B_{FL}$ and the reservoirs $19_1$; the normally closed electromagnetic valve $V_{CRR}$ is interposed between the proportional pressure reducing valve $14_R$ and the reservoirs $19_1$; the normally closed electromagnetic valve $V_{CFR}$ is interposed between the front right wheel brake $B_{FR}$ and the reservoirs $19_2$; and the normally closed electromagnetic valve $V_{CRL}$ is interposed between the proportional pressure reducing valve $14_L$ and the reservoirs $19_2$.

With the brake hydraulic controller 15 having the above described configuration, the normally open electromagnetic valves $V_{OFL}$, $V_{ORR}$, $V_{ORF}$, and $V_{ORL}$ are in demagnetized and open conditions, and the normally closed electromagnetic valves $V_{CFL}$, $V_{CRR}$, $V_{CRF}$, and $V_{CRL}$ are in demagnetized and closed conditions during normal braking in which there is a low risk of locking of the wheels. Hence, the hydraulic braking pressure output from the output port $13_1$ of the master cylinder M acts on the rear right wheel brake $B_{RR}$ via the normally open electromagnetic valve $V_{ORR}$ and the proportional pressure reducing valve $14_R$ as well as on the front left wheel brake $B_{FL}$ via the normally open electromagnetic valve $V_{OFL}$. Further, the hydraulic braking pressure output from the output port $13_2$ of the master cylinder M acts on the rear left wheel brake $B_{RL}$ via the normally open electromagnetic valve $V_{ORL}$ and the proportional pressure reducing valve $14_L$ as well as on the front right wheel brake $B_{FR}$ via the normally open electromagnetic valve $V_{OFR}$.

During anti-lock braking carried out when a wheel becomes apt to lock as a result of braking, the normally open electromagnetic valve of the normally open electromagnetic valves $V_{OFL}$, $V_{ORR}$, $V_{ORF}$, and $V_{ORL}$ corresponding to the wheel which is likely to lock is closed, whereas the normally closed electromagnetic valve of the normally closed electromagnetic valves $V_{CFL}$, $V_{CRR}$, $V_{CRF}$, and $V_{CRL}$ corresponding to that wheel is opened. In consequence, a part of the hydraulic braking pressure escapes to the reservoir $19_1$ or $19_2$, so that the hydraulic braking pressure is depressurized. In order to hold the hydraulic braking pressure, it is only necessary to demagnetize the normally closed electromagnetic valves $V_{CFL}$, $V_{CRR}$, $V_{CRF}$, $V_{CRL}$ so as to be held in a closed condition as well as to excite the normally open electromagnetic valves $V_{OFL}$, $V_{ORR}$, $V_{ORF}$, and $V_{ORL}$ so as to close. On the other hand, in order to increase the hydraulic braking pressure, it is only necessary to demagnetize the normally closed electromagnetic valves $V_{CFL}$, $V_{CRR}$, $V_{CRF}$, $V_{CRL}$ so as to be held in a closed condition as well as to demagnetize the normally open electromagnetic valves $V_{OFL}$, $V_{ORR}$, $V_{ORF}$, and $V_{ORL}$ so as to open.

The motor 22 for commonly driving the pair of plunger pumps $21_1$, $21_2$ is activated during the anti-lock braking. The hydraulic fluid which escaped to the reservoirs $19_1$ and $19_2$ returns in an upstream direction with respect to the normally open electromagnetic valves $V_{OFL}$, $V_{ORR}$, $V_{ORF}$, and $V_{ORL}$, that is, the hydraulic passages $12_1$, $12_2$, from the plunger pumps $21_1$, $21_2$ via the dampers $24_1$, $24_2$ and the orifices $25_1$, $25_2$. Hence, the degree of depression of the brake pedal P caused by the master cylinder M does not increase in proportion to the amount of the hydraulic braking pressure escaped to the reservoirs $19_1$ and $19_2$. Further, pulsations of the hydraulic fluid flowing from the plunger pumps $21_1$, $21_2$ are attenuated by the action of the dampers $24_1$, $24_2$ and the orifices $25_1$, $25_2$, so that pulsations of the brake pedal P are attenuated.

The electronic control unit 26, which controls the demagnetization and excitation of the normally open electromagnetic valves $V_{OFL}$, $V_{ORR}$, $V_{ORF}$, and $V_{ORL}$ and the normally closed electromagnetic valves $V_{CFL}$, $V_{CRR}$, $V_{CRF}$, $V_{CRL}$, receives signals from wheel speed sensors $27_{FL}$, $27_{RR}$, $27_{FR}$, and $27_{RL}$ which respectively detect the speed of the wheels in order to check whether or not the wheels are likely to lock. Further, the electronic control unit 26 receives a signal from a hand brake sensor 29 which checks whether or not a hand brake 28 is actuated. Moreover, the electronic control unit 26 is connected to an alarm 30, such as a lamp, which is activated by the electronic control unit 26 when the wheel is in the antilock braking condition.

Figure 2:
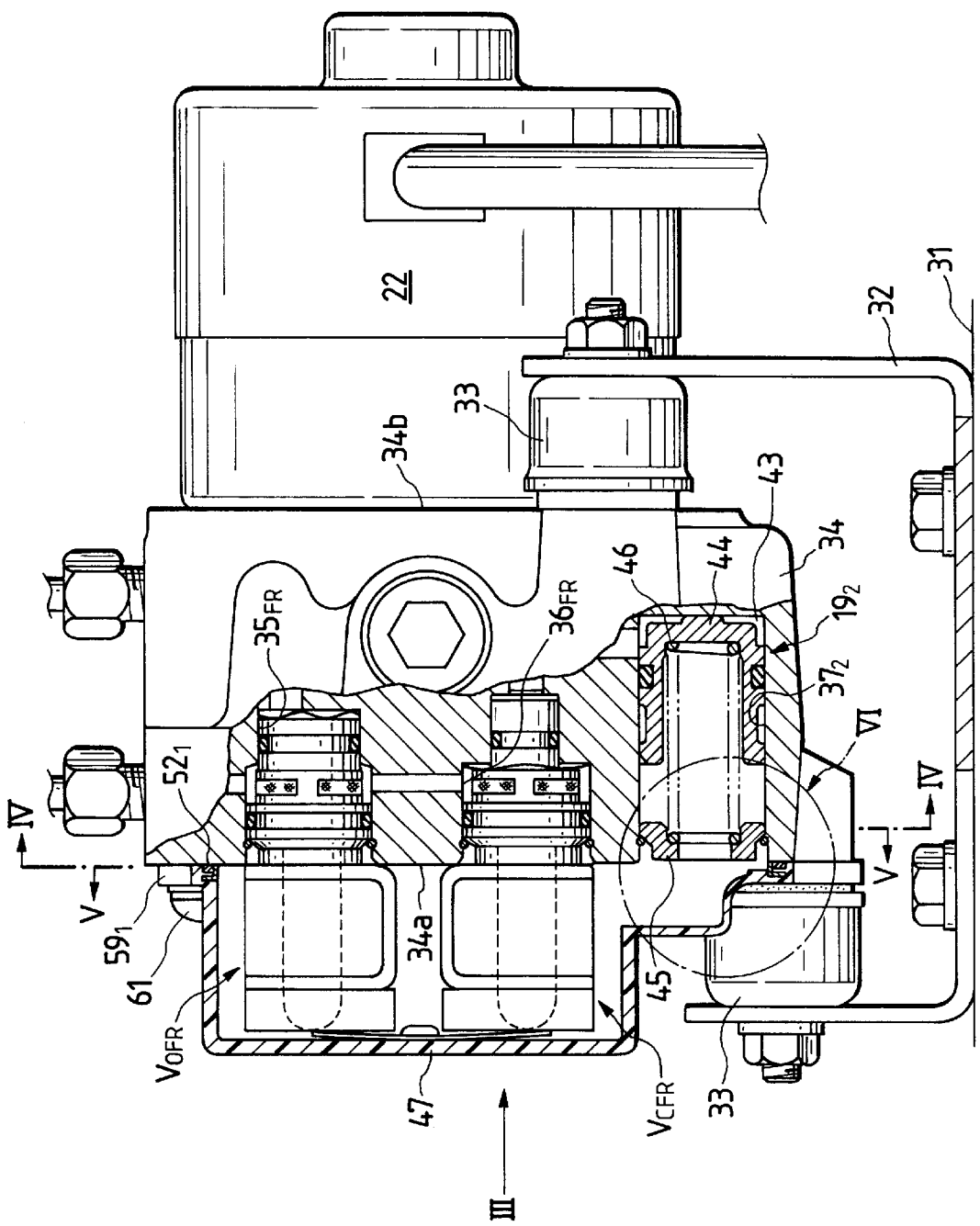
FIG. 2 is a partially cutaway side view of a brake hydraulic controller.

Referring to FIG. 1 in conjunction with FIG. 2, the elements forming the brake hydraulic controller 15 are mounted on a block-shaped metal base 34 in which the elements are the four normally open electromagnetic valves $V_{OFL}$, $V_{ORR}$, $V_{ORF}$, and $V_{ORL}$, the four check valves $17_{FL}$, $17_{RR}$, $17_{FR}$, and $17_{RL}$, the four normally closed electromagnetic valves $V_{CFL}$, $V_{CRR}$, $V_{CRF}$, and $V_{CRL}$, the pair of reservoirs $19_1$, $19_2$, the pair of return pumps $20_1$, $20_2$, the pair of plunger pumps $21_1$, $21_2$, the motor 22, the pair of outlet valves $23_1$, $23_2$, the pair of dampers $24_1$, $24_2$, and the pair of orifices $25_1$, $25_2$.

The base body 34 has a pair of opposite faces, that is, a face 34a and a face 34b. The base body 34 is supported on a bracket 32, which is mounted on a vehicle body 31, by a plurality of mounting devices 33 in such a way that both faces 34a and 34b are faced to each other in the vertical direction.

Figure 3:
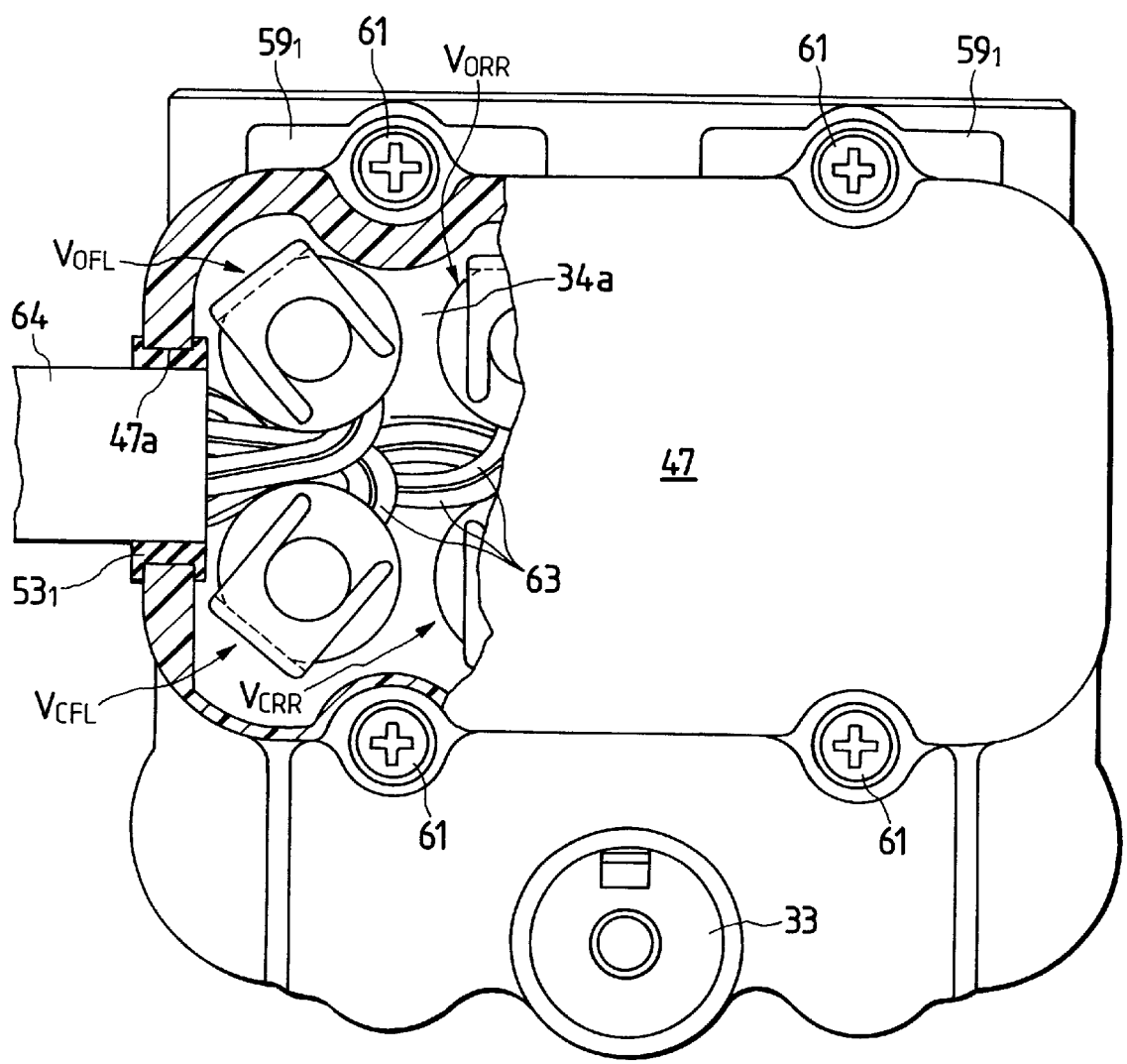
FIG. 3 is a front view of the brake hydraulic controller as viewed in the direction of an arrow III shown in FIG. 2.
Figure 4:
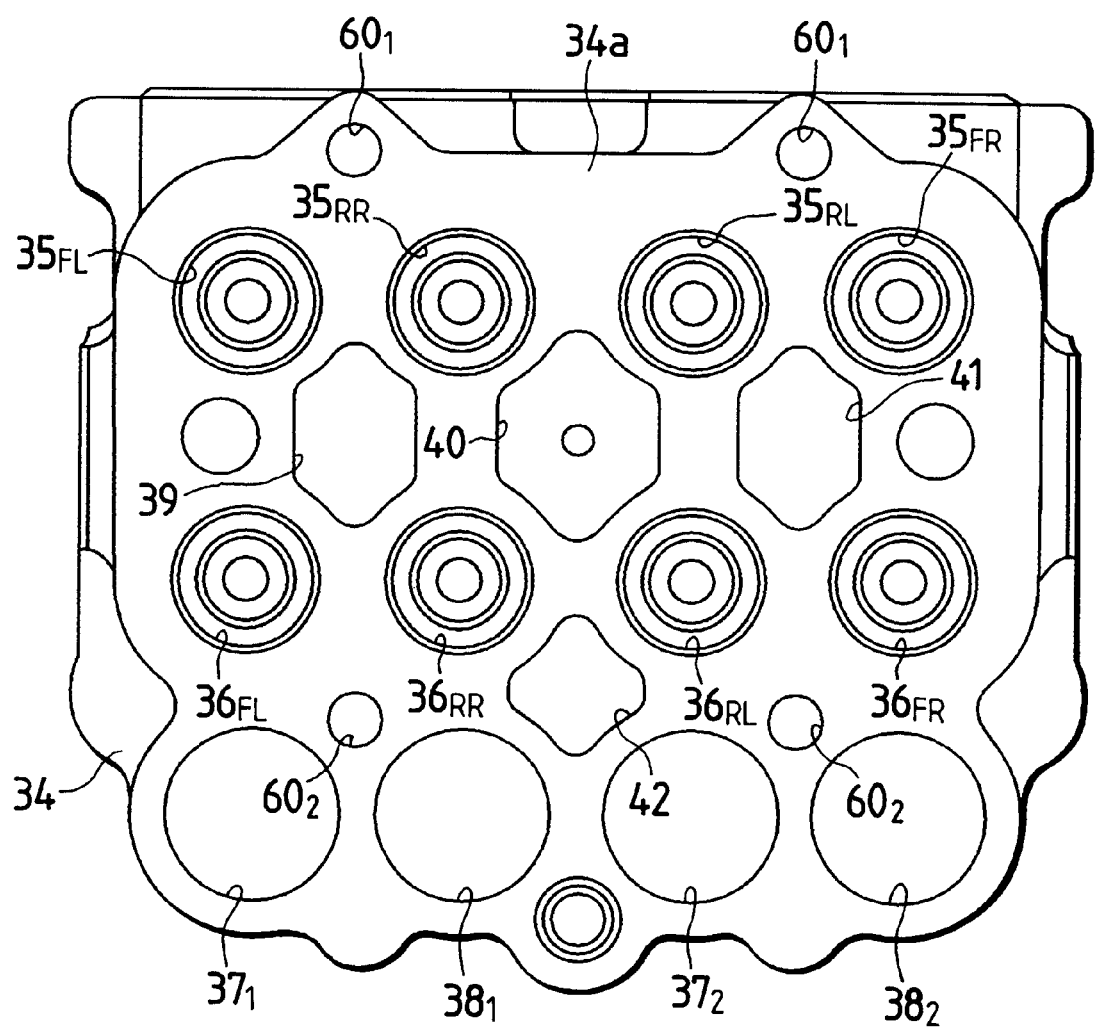
FIG. 4 is a front view of a base taken along line IV—IV shown in FIG. 2.

Referring to FIGS. 3 and 4, four engaging recesses $35_{FL}$, $35_{RR}$, $35_{FR}$, and $35_{RL}$ and four engaging recesses $36_{FL}$, $36_{RR}$, $36_{FR}$, and $36_{RL}$ are formed in the face 34a of the base 34 in parallel to each other. Further, two reservoir recesses $37_1$, $37_2$ and two damping recesses $38_1$, and $38_2$ are also formed in the face 34a in parallel to the above described engaging recesses in such a way as to have the following correspondence between them: namely, the reservoir recess $37_1$ is placed in line with the engaging recesses $35_{FL}$, $36_{FL}$; the damping recess $38_1$ is placed in line with the engaging recesses $35_{RR}$, $36_{RR}$; the reservoir recess $37_2$ is placed in line with the engaging recesses $35_{RL}$, $36_{RL}$; and the damping recess $38_2$ is placed in line with the engaging recesses $35_{FR}$, $36_{FR}$. Further, lightening recesses 39, 40, 41, and 42 are formed in the face 34a so as to have the following position relationship with respect to the above described elements; namely, the lightening recess 39 is surrounded by the engaging recesses $35_{FL}$, $35_{RR}$, $36_{FL}$, and $36_{RR}$; the lightening recess 40 is surrounded by the engaging recesses $35_{RR}$, $35_{RL}$, $36_{RR}$, and $36_{RL}$; the lightening recess 41 is surrounded by engaging recesses $35_{RL}$, $35_{FR}$, $36_{RL}$, and $36_{FR}$; and the lightening recess 42 is surrounded by the engaging recesses $36_{RR}$, $36_{RL}$ and the damping recesses $38_1$, $38_2$.

As described above, the face 34a of the base 34 includes the four normally open electromagnetic valves $V_{OFL}$, $V_{ORR}$, $V_{ORF}$, and $V_{ORL}$, the four normally closed electromagnetic valves $V_{CFL}$, $V_{CRR}$, $V_{CRF}$, and $V_{CRL}$, the pair of reservoirs $19_1$, $19_2$, and the pair of dampers $24_1$, $24_2$. The motor 22 is mounted on the other face 34b of the base 34, and the pair of plunger pumps $21_1$, $21_2$ driven by the motor 22 are incorporated in the base 34.

The normally open electromagnetic valves $V_{OFL}$, $V_{ORR}$, $V_{ORF}$, and $V_{ORL}$ are fitted into the corresponding engaging recesses $35_{FL}$, $35_{RR}$, $35_{FR}$, and $35_{RL}$ such that each half of these normally open electromagnetic valves protrude from the face 34a. Similarly, the normally closed electromagnetic valves $V_{CFL}$, $V_{CRR}$, $V_{CRF}$, and $V_{CRL}$ are fitted into the corresponding engaging recesses $36_{FL}$, $36_{RR}$, $36_{FR}$, and $36_{RL}$ such that each half of these normally open electromagnetic valves protrude from the face 34a.

As shown in FIG. 2, the reservoir $19_2$ includes a reservoir chamber 43 formed between the closed end face of the reservoir recess $37_2$ and a piston 44 which is fitted into the reservoir recess $37_2$ in a slidable fashion; an annular closure 45 fixedly fitted around the open end of the reservoir recess $37_2$; and a return spring 46 compressedly interposed between the closure 45 and the piston 44. The reservoir $19_1$ is principally the same as the $19_2$ in construction, and it is housed in the reservoir recess $37_1$.

The dampers $24_1$, $24_2$ are housed in the damping recesses $38_1$, $38_2$, and each of the open ends of the damping recesses is sealed with a plug (not shown) in a fluid-tight manner.

Figure 5:
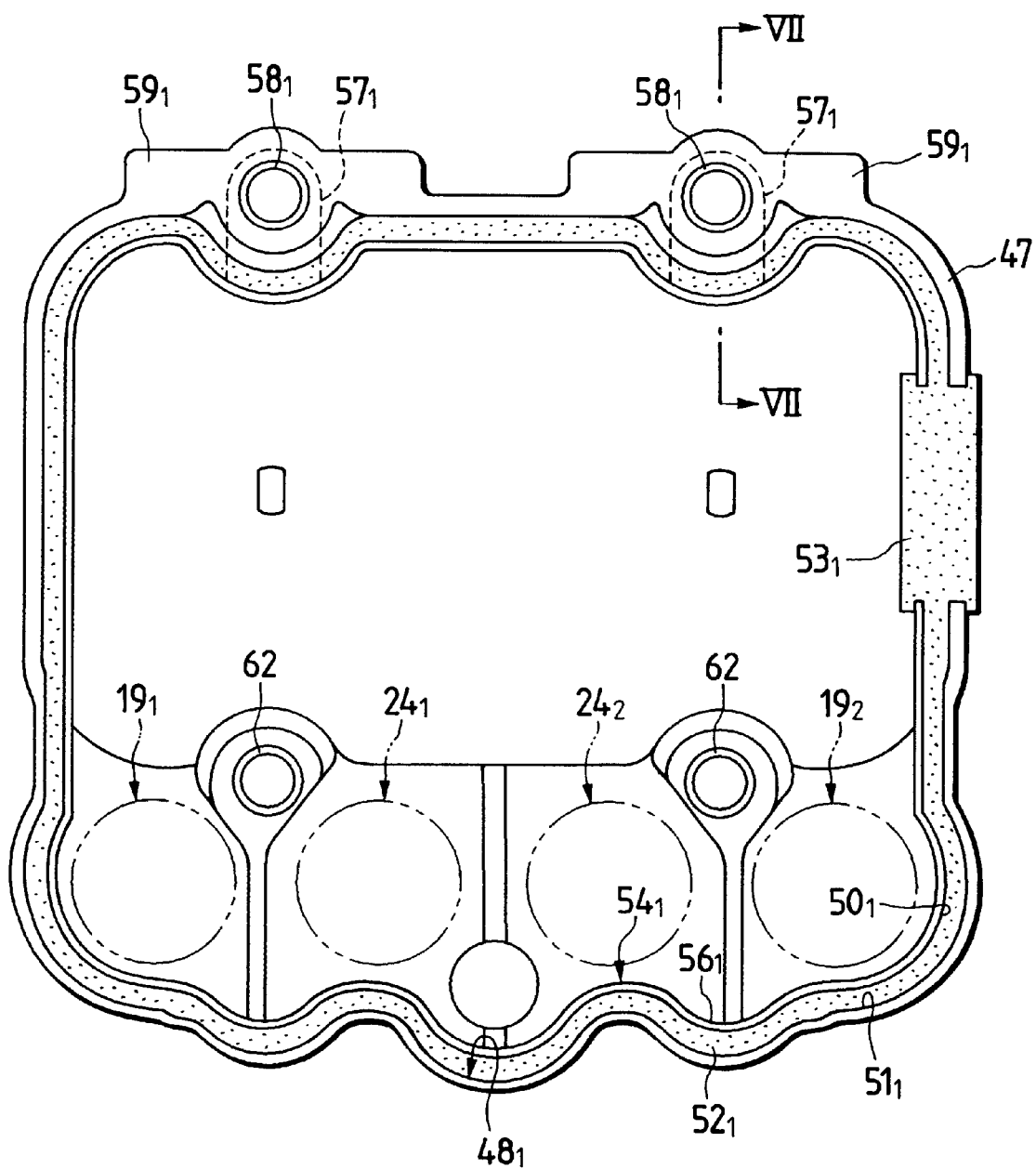
FIG. 5 is a bottom view of a cover taken along line V—V shown in FIG. 2.
Figure 6:
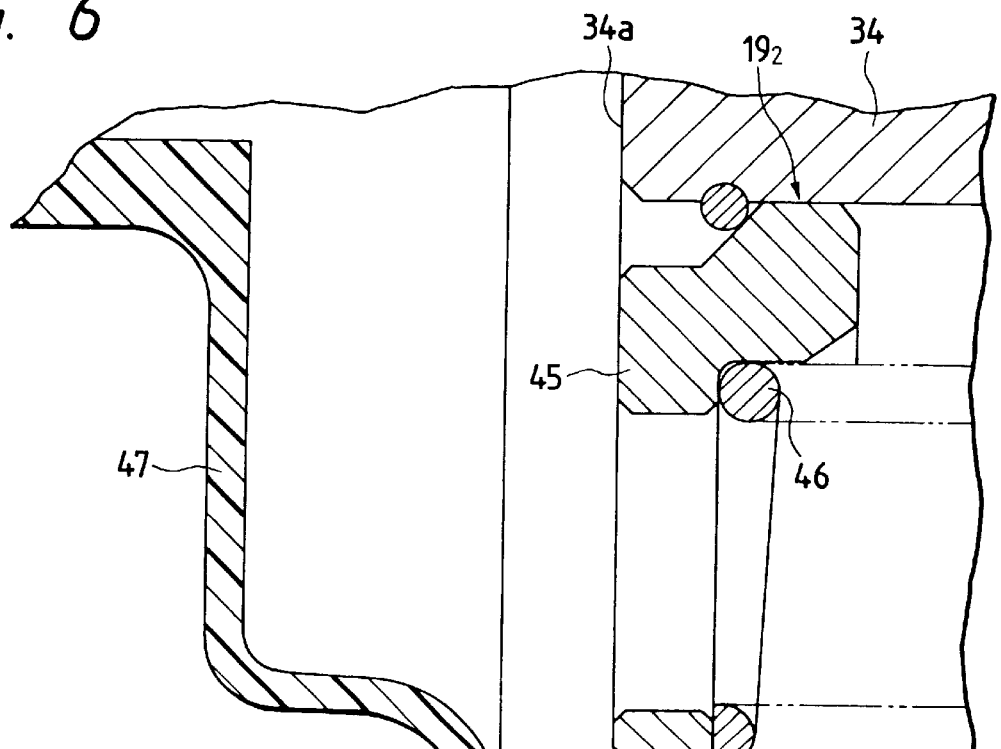
FIG. 6 is an enlarge view of an area VI shown in FIG. 2.

With reference to FIGS. 5 and 6, a plastic cover 47 is attached to the surface 34a of the base 34 so as to cover the normally open electromagnetic valves $V_{OFL}$, $V_{ORR}$, $V_{ORF}$, and $V_{ORL}$, the normally closed electromagnetic valves $V_{CFL}$, $V_{CRR}$, $V_{CRF}$, $V_{CRL}$, the reservoirs $19_1$, $19_2$, the dampers $24_1$, $24_2$, and the lightening recesses 39 to 42.

A seal groove $48_1$ having a substantially U-shaped cross section is formed along the entire circumference of the side of the cover 47 that faces the face 34a. The seal groove $48_1$ is made up of an innermost closed surface $49_1$ and a pair of side surfaces $50_1$, $51_1$ connected to both sides of the innermost closed surface $49_1$ substantially at right angles. A sealing member $52_1$ which is fitted in the seal groove $48_1$ is elastically brought into contact with the face 34a. As a result, it possible to prevent the entry of water or dust into the cover 47.

The seal groove $48_1$ includes a recess formed along the inner edge of the side of the cover 47 that faces the face 34a, and a reinforcing member $54_1$ which is embedded in the cover 47 and is made of rigid material. The reinforcing member $54_1$ includes a support plate $55_1$ which extends substantially in parallel with the face 34a and is embedded in the cover 47, and a side portion $56_1$ which is connected to the inner edge of the support plate $55_1$ at substantially right angles. The reinforcing member $54_1$ has a substantially L-shaped cross section. The support plate $55_1$ is embedded in the cover 47 to be spaced apart from the innermost closed surface $49_1$ formed in the cover 47. The side portion $56_1$ forms the side surface $50_1$ of the two side surfaces $50_1$, $51_1$, and the side portion $56_1$ is connected to the support plate $55_1$.

As shown in FIG. 4, screw holes $60_1$, $60_1$ are formed in the vicinity of the outer periphery of the face 34a of the base 34, and screw holes $60_2$, $60_2$ are formed in the face 34a in the vicinity of the reservoir and damping recesses; more specifically, the screw hole $60_1$ is formed in the vicinity of the outer periphery defined between the engaging recesses $35_{FL}$ and $35_{RR}$; the screw hole $60_1$ is formed in the vicinity of the outer periphery defined between the engaging recesses $35_{RL}$ and $35_{FR}$; the screw hole $60_2$ is formed to be surrounded by the engaging recesses $36_{FL}$, $36_{RR}$, the reservoir recess $37_1$, and the damping recess $38_1$; and the screw hole $60_2$ is formed to be surrounded by the engaging recesses $36_{RL}$, $36_{FR}$, the reservoir recess $37_2$ and the damping recess $38_2$.

Figure 7:
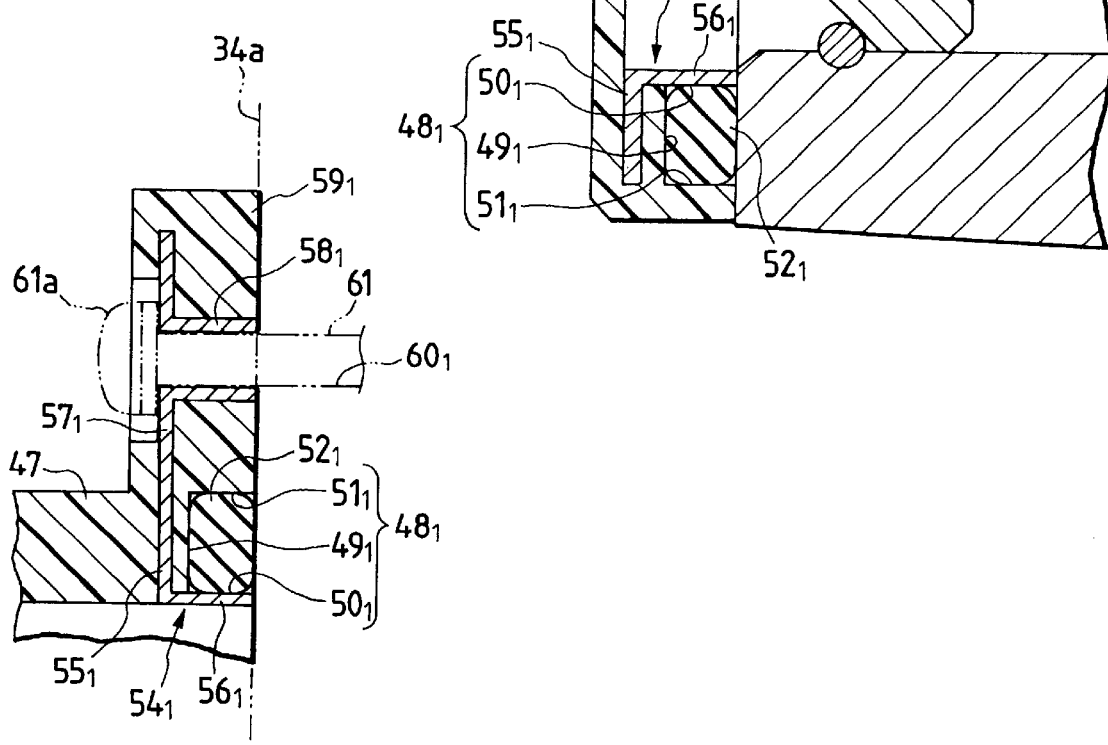
FIG. 7 is a cross-sectional view of the cover taken along line VII—VII shown in FIG. 5.

The support plate $55_1$ of the reinforcing member $54_1$ includes an extended plate $57_1$ extending outwardly at a portion corresponding to the screw holes $60_1$, as shown in FIG. 7. The support plate $55_1$ includes a cylindrical projection $58_1$ having one end brought into contact with the face 34a at the portion corresponding to the screw holes $60_1$ and the other end integrally formed in the extended plate $57_1$. A fastening bolt 61 to be screwed into the screw hole $60_1$ is inserted into each cylindrical projection $58_1$. A lock head 61a of the fastening bolt 61 engages with the base side of the cylindrical projection $58_1$, that is, the extended plate $57_1$. The cover 47 includes arms $59_1$, $59_1$ which cover the extended plates $57_1$, $57_1$ and the cylindrical projections $58_1$, $58_1$ in order to make it possible to insert the fastening bolts 61 into the cylindrical projections $58_1$, $58_1$ from above as well as to engage the lock head 61a of the fastening bolt 61 with the base side of the cylindrical projections $58_1$, $58_1$.

Cylindrical sleeves 62, 62 (FIG. 5) are integrally embedded in the cover 47 corresponding to the screw holes $60_2$, $60_2$ of the base 34. The fastening bolts 61, 61 are screwed into the screw holes $60_2$, $60_2$ via the sleeves 62, 62.

Figure 8:
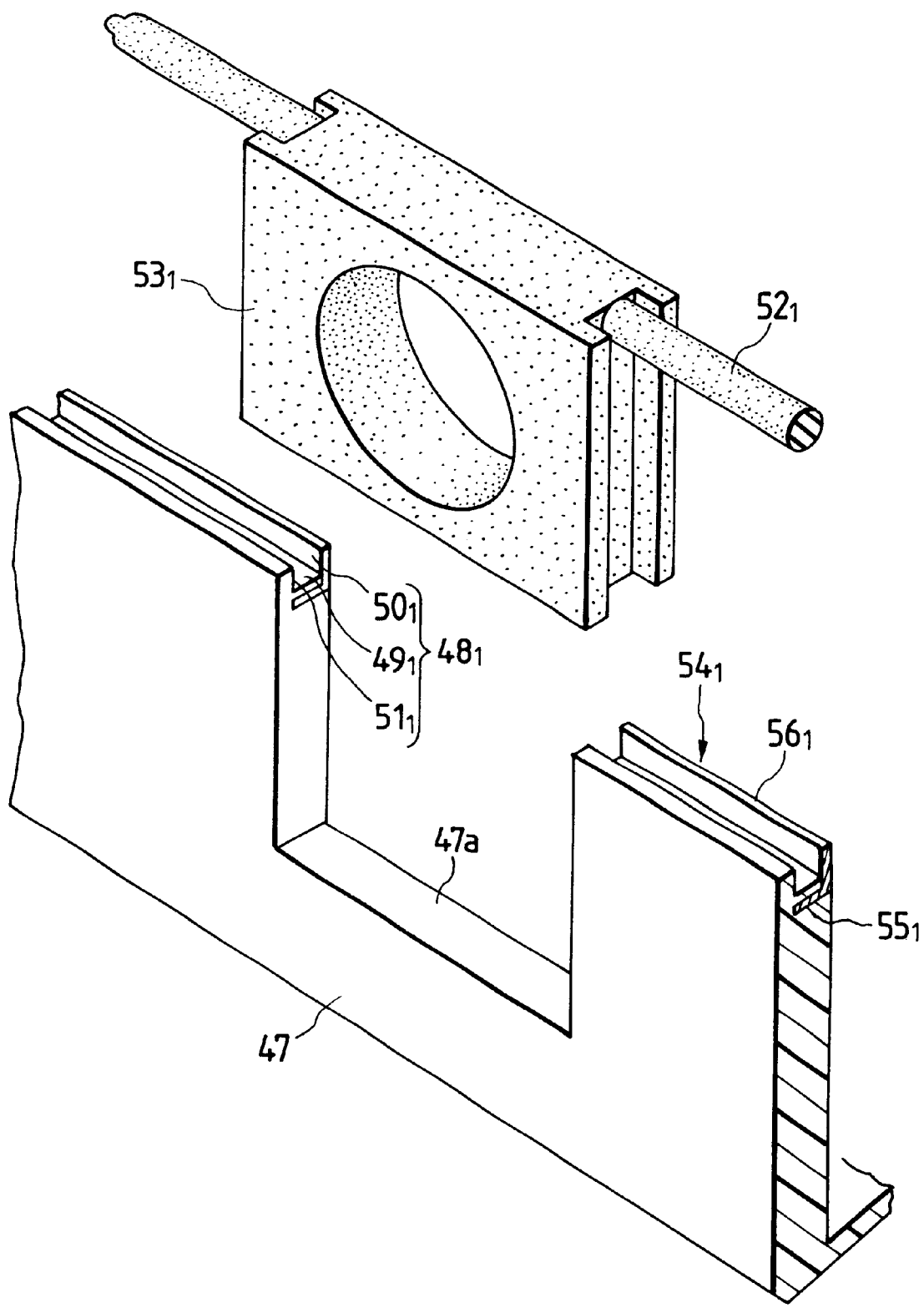
FIG. 8 is an exploded perspective view of a sealing member, a grommet, and the cover.

As shown in FIG. 3, electrical wires 63, 63, which are respectively connected to the normally open electromagnetic valves $V_{OFL}$, $V_{ORR}$, $V_{ORF}$, $V_{ORL}$ and the normally closed electromagnetic valves $V_{CFL}$, $V_{CRR}$, $V_{CRF}$, $V_{CRL}$, are tied into a wire harness 64, and the wire harness 64 is led out of the cover 47. A grommet $53_1$ for sealing the space between the wire harness 64 and the cover 47 is integrated with the sealing member $52_1$, as shown in FIG. 8. The grommet $53_1$ is fitted into a notch 47a formed in the cover 47.

The operation of the brake hydraulic controller of the first embodiment will now be described. The normally open electromagnetic valves $V_{OFL}$, $V_{ORR}$, $V_{ORF}$, $V_{ORL}$, the normally closed electromagnetic valves $V_{CFL}$, $V_{CRR}$, $V_{CRF}$, $V_{CRL}$, the reservoirs $19_1$, $19_2$, and the dampers $24_1$, $24_2$ are mounted on the face 34a of the base 34. The sealing member $52_1$ which elastically comes into contact with the face 34a is fitted in the cover 47 which is attached to the face 34a of the base 34 so as to cover the normally open electromagnetic valves $V_{OFL}$, $V_{ORR}$, $V_{ORF}$, $V_{ORL}$, the normally closed electromagnetic valves $V_{CFL}$, $V_{CRR}$, $V_{CRF}$, $V_{CRL}$, the reservoirs $19_1$, $19_2$, and the dampers $24_1$, $24_2$.

In short, the normally open electromagnetic valves $V_{OFL}$, $V_{ORR}$, $V_{ORF}$, $V_{ORL}$, the normally closed electromagnetic valves $V_{CFL}$, $V_{CRR}$, $V_{CRF}$, $V_{CRL}$, the reservoirs $19_1$, $19_2$, and the dampers $24_1$, $24_2$ are prevented from being exposed to water by the single cover 47 and the sealing member $52_1$, which makes it possible to prevent electrical leakage and rust. In consequence, the number of parts required to render the normally open electromagnetic valves $V_{OFL}$, $V_{ORR}$, $V_{ORF}$, $V_{ORL}$, the normally closed electromagnetic valves $V_{CFL}$, $V_{CRR}$, $V_{CRF}$, $V_{CRL}$, the reservoirs $19_1$, $19_2$, and the dampers $24_1$, $24_2$ waterproof is minimized, which makes it possible to reduce the number of parts of the brake hydraulic controller. It is also possible to reduce the number of manhours required to mount the above described elements to the base 34.

In the reservoirs $19_1$, $19_2$, there is a concern about obstruction of the smooth movement of the piston 44 in response to the inflow of the hydraulic fluid into the reservoir chamber 43 and the outflow of the hydraulic fluid from the same while the space outside the piston 44 is hermetically closed. Since the cover 47 covers all of the normally open electromagnetic valves $V_{OFL}$, $V_{ORR}$, $V_{ORF}$, $V_{ORL}$, the normally closed electromagnetic valves $V_{CFL}$, $V_{CRR}$, $V_{CRF}$, $V_{CRL}$, the reservoirs $19_1$, $19_2$, and the dampers $24_1$, $24_2$, the volume of the space enclosed by the cover 47 becomes relatively large. Variations in the pressure within the cover 47 caused as a result of the movement of the piston 44 are suppressed to a small level, which in turn assures the smooth movement of the piston 44. If the cover is designed to cover only the reservoirs, the volume of the space in the cover has to become relatively small. As a result, variations in the pressure within the cover become larger, which results in the risk of obstruction of the smooth movement of the piston.

If the seal groove in which the sealing member $52_1$ is fitted is directly formed in the plastic cover 47, a relatively large load acts on the side of the seal groove resulting from the clamping of the cover 47 and the base together. As a result, the side of the seal groove is deformed, which makes it impossible to ensure sufficient sealing performance of the sealing member. In the first embodiment, the seal groove $48_1$ includes the innermost closed surface $49_1$ and the side surfaces $50_1$, $50_2$ attached to the respective sides of the innermost closed surface $49_1$. Further, of the side surfaces $50_1$, $51_1$, the side surface $50_1$ is made by the side surface $56_1$ of the reinforcing member $54_1$ which is formed from a rigid material and is embedded in the cover 47. In this way, the side surface $50_1$ has sufficient strength, and the sealing member $52_1$ can be sufficiently brought into close contact with the side surface $50_1$, which makes it possible to maintain the sufficient sealing performance.

The reinforcing member $54_1$ is embedded in the cover 47, and hence bond strength between the reinforcing member $54_1$ and the cover 47 can be sufficiently increased. The cover 47 and the reinforcing member $54_1$ can be integrated together when the cover 47 is formed. Therefore, when compared with the number of manhours required to attach the reinforcing member $54_1$ to the cover 47, the number of manhours to form the cover 47 integrated with reinforcing member $54_1$ can be reduced.

The reinforcing member $54_1$ integrally includes the cylindrical projections $58_1$ for clamping together the cover 47 and the face 34a of the base 34. The reinforcing member $54_1$ having high rigidity receives clamping torques of the fastening bolts 61, which makes it possible to effectively prevent the deformation of the seal groove $48_1$. Hence, the sealing performance of the seal groove $48_1$ can be improved to a much greater extent.

Figure 9:
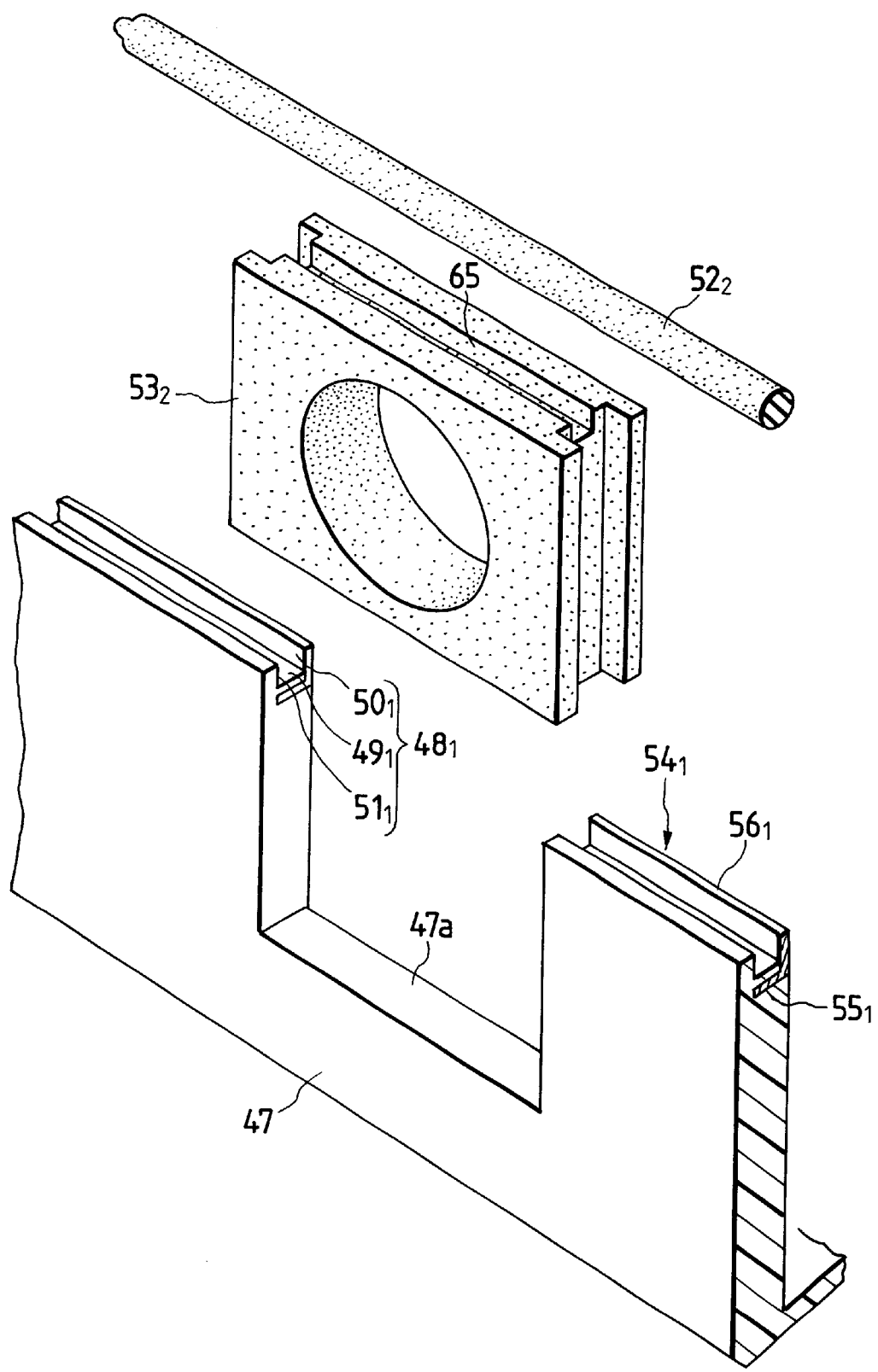
FIG. 9 is a perspective view of a vehicle brake hydraulic controller, according to a second embodiment, which is similar to FIG. 8.

FIG. 9 shows a brake hydraulic controller according to a second embodiment of the present invention. A grommet $53_2$ which is fitted into the notch 47a of the cover 47 may be provided separately from the sealing member $52_2$. In this case, a seal groove 65 is formed in the grommet $53_2$ to become in line with the seal groove $48_1$ of the cover 47 when the grommet $53_2$ is fitted to the cover 47. The sealing member $52_2$ is fitted into the seal groove $48_1$ of the cover 47 and the seal groove 65 of the grommet $53_2$.

Figure 10:
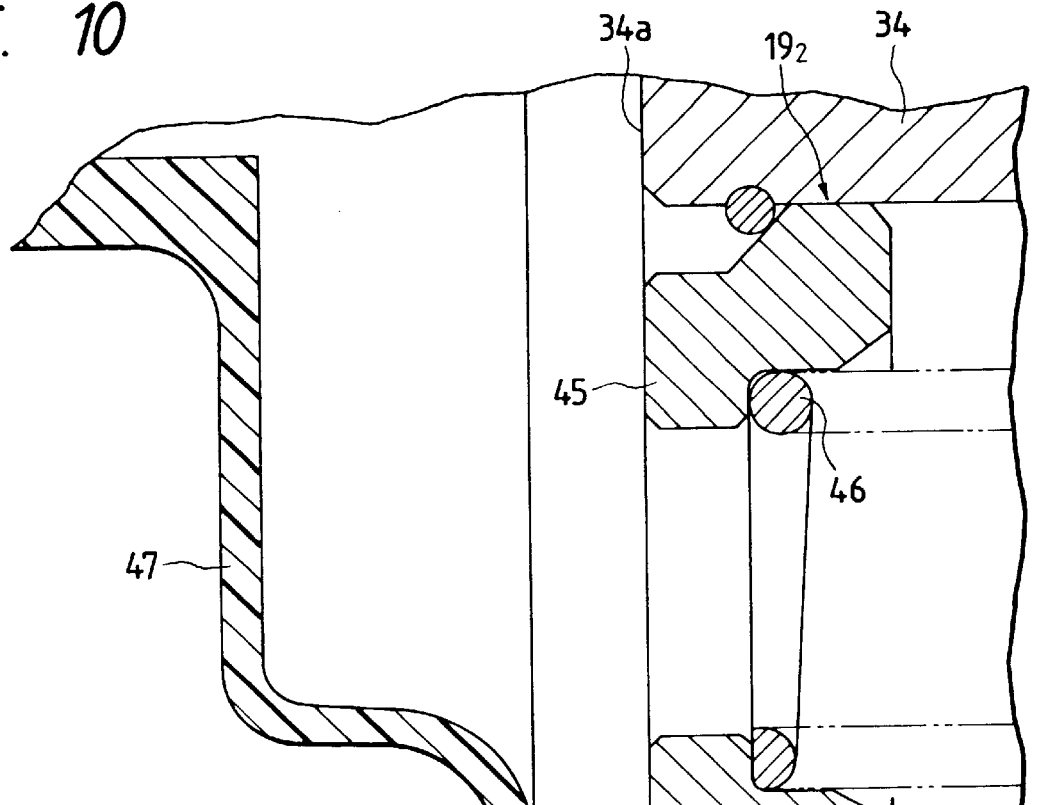
FIG. 10 is a cross-sectional view of a vehicle brake hydraulic controller, according to a third embodiment, which is similar to FIG. 6.
Figure 11:
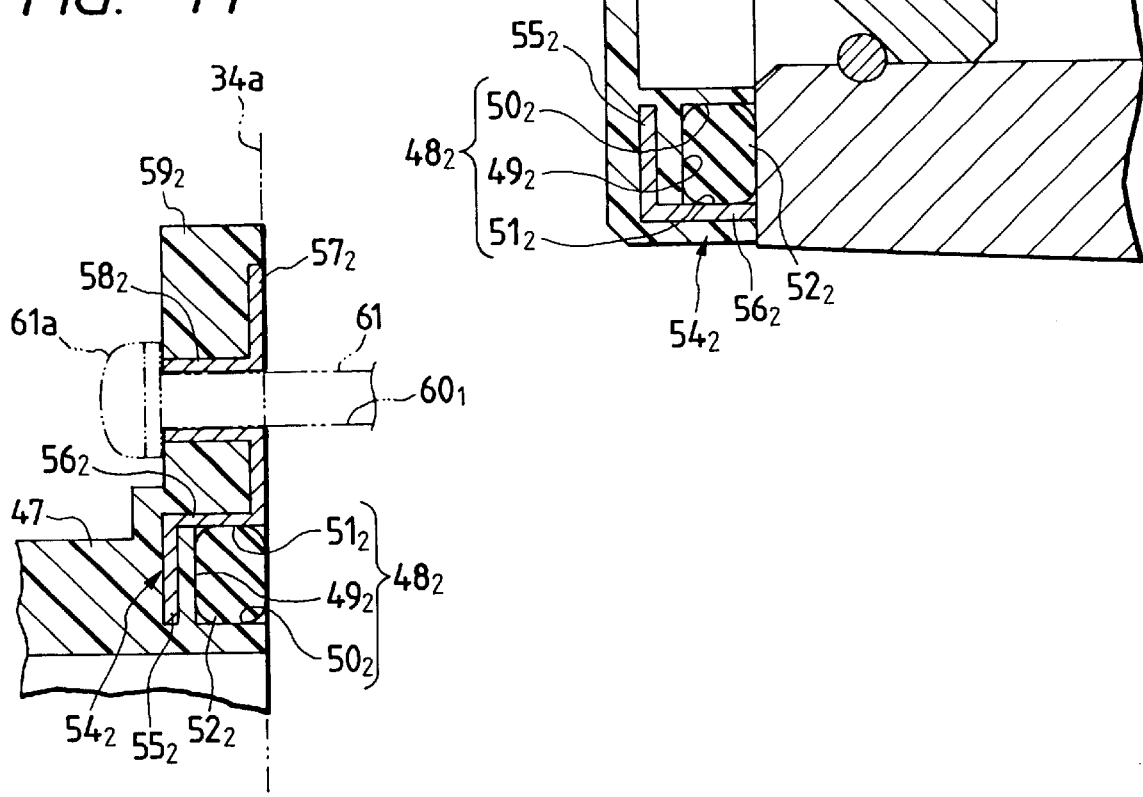
FIG. 11 is a cross-sectional view of the vehicle brake hydraulic controller, according to the third embodiment, which is similar to FIG. 7.

FIGS. 10 and 11 show a brake hydraulic controller according to a third embodiment of the present invention. The same reference numerals are used to designate the corresponding elements in the first embodiment.

In FIG. 10, a seal groove $48_2$ having a substantially U-shaped cross section is formed along the entire circumference of the side of the cover 47, to be attached to the face 34a of the base 34, that faces the face 34a of the base 34. The seal groove $48_2$ is made up of an innermost closed surface $49_2$ and a pair of side surfaces $50_2$, $51_2$ connected to both sides of the innermost closed surface $49_2$ substantially at right angles. A sealing member $52_2$ which is fitted in the seal groove $48_2$ is elastically brought into contact with the face 34a.

The seal groove $48_2$ includes a recess formed along the outer edge of the side of the cover 47 that faces the face 34a, and a reinforcing member $54_2$ which is embedded in the cover 47 and is made of a rigid material. The reinforcing member $54_2$ includes a support plate $55_2$ which extends substantially in parallel with the face 34a and is embedded in the cover 47, and a side portion $56_2$ which is connected to the outer edge of the support plate $55_2$ at substantially right angles.

The support plate $55_2$ is embedded in the cover 47 to be spaced apart from an innermost closed surface $51_2$ formed in the cover 47. The side portion $56_2$ forms the side surface $51_2$ of the two side surfaces $50_2$, $51_2$, and the side portion $56_2$ is connected to the support plate $55_2$.

In FIG. 11, an extended plate $57_2$ integrally extends from the side portion $56_2$ of the reinforcing member $54_2$ so as to come into contact with the face 34a of the base 34. The portions of the extended plate $57_2$ corresponding to the screw holes $60_1$ extend to the outside. One end of a cylindrical projection $58_2$ is integrally formed in the extended plate $57_1$. The fastening bolt 61 to be screwed into the screw hole $60_1$ is inserted into the cylindrical projection $58_2$. The lock head 61a of the fastening bolt 61 engages with the other side of the cylindrical projection $58_2$. The cover 47 includes an arm $59_2$ which covers the extended plate $57_2$ and the cylindrical projection $58_2$ in order to make it possible to insert the fastening bolts 61 into the cylindrical projection $58_2$ from above as well as to engage the lock head 61a of the fastening bolt 61 with the other side of the cylindrical projection $58_2$.

Even in the third embodiment, the same effects as those obtained in the first embodiment can be obtained.

Figure 12:
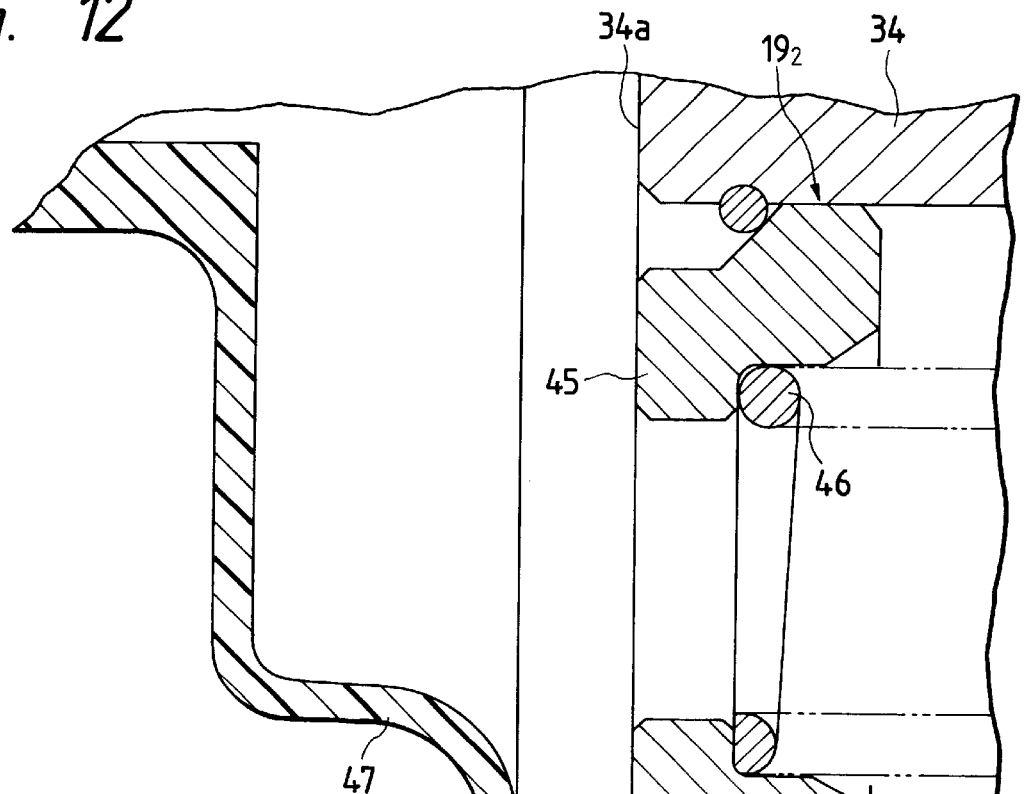
FIG. 12 is a cross-sectional view of a vehicle brake hydraulic controller, according to a fourth embodiment, which is similar to FIG. 7.
Figure 13:
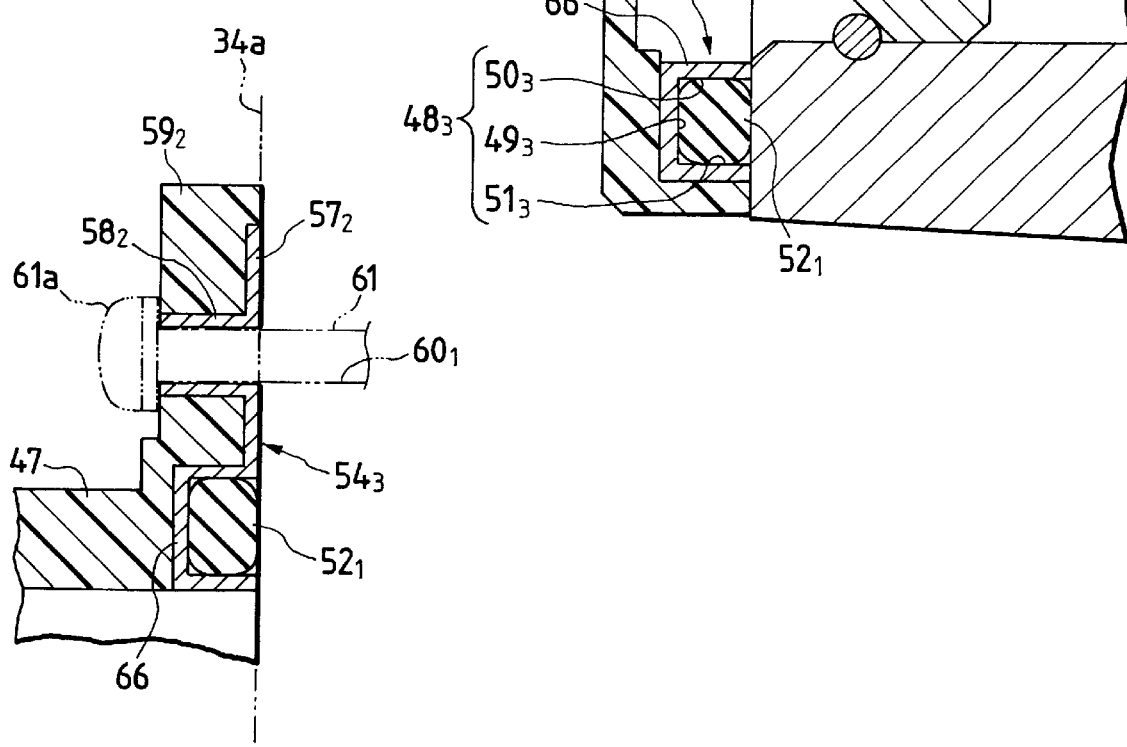
FIG. 13 is a cross-sectional view of the vehicle brake hydraulic controller, according to the fourth embodiment, which is similar to FIG. 7.

FIGS. 12 and 13 show a brake hydraulic controller according to a fourth embodiment of the present invention. The same reference numerals are used to designate the corresponding elements in each of the previous embodiments.

In FIG. 12, a seal groove 483 having a substantially U-shaped cross section is formed along the entire circumference of the side of the cover 47, to be attached to the 34a of the base 34, that faces the face 34a of the base 34. The seal groove $48_3$ is made up of an innermost closed surface $49_3$ and a pair of side surfaces $50_3$, $51_3$ connected to both sides of the innermost closed surface $49_3$ substantially at right angles. The sealing member $52_1$ (or $52_2$) which is fitted in the seal groove $48_2$ is elastically brought into contact with the face 34a.

The seal groove $48_3$ has a substantially U-shaped cross section and includes the pair of side surfaces $50_3$, $51_3$ connected to both sides of the innermost closed surface $49_3$. The seal groove $48_3$ is formed from a reinforcing member $54_3$ which is embedded in the cover 47 and is made of a rigid material. In short, the reinforcing member $54_2$ has a substantially U-shaped cross section and a groove forming portion 66 which is provided substantially at right angles with respect to the reinforcing member $54_2$. The groove forming portion 66 has a substantially U-shaped cross section and has an interior surface made by the combination of the innermost closed surface $49_3$ and the pair of side surfaces $50_3$, $51_3$.

In FIG. 13, the extended plate $57_2$ integrally extends from the groove forming portion 66 of the reinforcing member $54_3$ so as to come into contact with the face 34a of the base 34. The portions of the extended plate $57_2$ corresponding to the screw holes $60_1$ extend to the outside. One end of the cylindrical projection $58_2$ is integrally formed in the extended plate $57_2$. The fastening bolt 61 to be screwed into the screw hole $60_2$ is inserted into the cylindrical projection $58_2$. The lock head 61a of the fastening bolt 61 engages with the other side of the cylindrical projection $58_2$. The cover 47 includes the arm $59_2$ which covers the extended plate $57_2$ and the cylindrical projection $58_2$ in order to make it possible to insert the fastening bolts 61 into the cylindrical projection $58_2$ from above as well as to engage the lock head 61a of the fastening bolt 61 with the other side of the cylindrical projection $58_2$.

Even in the fourth embodiment, it is possible to provide sufficient strength in the seal groove $48_3$. The cover 47 and the reinforcing member $54_3$ can be integrated together when the cover 47 is formed, which makes it possible to improve the bond strength between the reinforcing member $54_3$ and the cover 47. Further, the manhours required to assemble he reinforcing member $54_3$ and the cover 47 into an integrated unit can be reduced.

In the fourth embodiment, the mating plane between the exterior surface of the groove forming portion 66 of the reinforcing member $54_3$ and the cover 47 is exposed to the outside and inside of the cover 47 without the presence of the sealing member $52_1$ or the sealing member $52_2$ between the mating plane and the outside and inside of the cover 47. In contrast to the fourth embodiment, the mating plane between the reinforcing member $54_1$ and the cover 47 directly faces the inside of the cover 47, but it faces the outside with the sealing member $52_1$ interposed between the outside and the mating plane, as described in the first embodiment in FIG. 6. As a result, water is prevented from entering the mating plane between the reinforcing member $54_1$ and the cover 47. Therefore, the cover 47 of the first embodiment can provide superior sealing performance as compared with the cover 47 of the fourth embodiment. Further, the mating plane between the reinforcing member $54_2$ and the cover 47 directly faces the outside of the cover 47, but it faces the inside of the cover with the sealing member $52_2$ interposed between the inside and the mating plane, as described in the second embodiment in FIG. 10. As a result, even if water enters the mating plane between the reinforcing member $54_2$ and the cover 47, the water will not enter the inside of the cover 47. Therefore, the cover 47 of the second embodiment can provide superior sealing performance as compared with the cover 47 of the fourth embodiment.

Although the illustrative embodiments of the present invention have been described in detail in the above, the present invention is not limited to the above described specific embodiments. Various modifications of the present invention can be construed without departing from the scope and spirit of the invention.

For example, at least one of the innermost closed surface and the side surfaces connected to both sides of thereof, which form the seal groove, may be formed from a reinforcing member to be bonded to the cover. Further, only the innermost closed surface of the elements constituting the seal groove, that is, the innermost closed surface and both side surfaces of the seal groove, may be formed from the reinforcing member.

As described above, according to the brake hydraulic controller of the first embodiment, a cover is attached to one side of a base so as to cover normally open electromagnetic valves, normally closed electromagnetic valves, reservoirs, and dampers mounted on the same side of the base. A sealing member which comes into elastic contact with the above described side of the base is attached to a seal groove formed in the cover. As a result, the volume of the space formed in the cover is relatively increased, and the smooth actuation of the reservoirs is assured. Therefore, it is possible to render the normally open electromagnetic valves, the normally closed electromagnetic valves, the reservoirs, and the dampers waterproof with the use of the minimum number of parts. A reduction in the number of the components makes it possible to reduce the number of manhours required to assembly the brake hydraulic controller.

In addition to the configuration of the brake hydraulic controller of the first embodiment, the cover is made from plastic, and the seal groove is made up of an innermost closed end and a pair of side surfaces connected to both sides thereof substantially at right angles, so as to have a substantially U-shaped cross section, according to the brake hydraulic controller of the second embodiment. A reinforcing member, which is made of a rigid material and forms at least one of the innermost closed surface and the side surfaces, is provided in the cover. As a result, it is possible to firmly maintain the contact between the sealing member and at least one of the innermost closed surface and the side surfaces of the seal groove. Therefore, the cover can provide sufficient sealing performance.

In addition to the configuration of the brake hydraulic controller of the second embodiment, the reinforcing member is embedded in the cover, according to the brake hydraulic controller of the third embodiment. Therefore, the bond strength between the reinforcing member and the cover can be increased, and the manhours required to assemble the brake hydraulic controller can be reduced.

In addition to the configuration of the brake hydraulic controller of the third embodiment, cylindrical portions having one end brought into contact with the side of the base are integrally formed in the reinforcing member. A lock head of a fastening bolt to be screwed into the base through the cylindrical portion is engaged with the other end of the cylindrical portion. Therefore, the reinforcing member having rigidity receives a clamping torque of the fastening bolt, which in turn prevents the seal groove from being deformed. Hence, the sealing performance of the cover can be improved to a much greater extent.

What is claimed is:

1. A brake hydraulic controller for controlling hydraulic pressure from a master cylinder for operating a wheel brake, comprising:
   a base;
   a first electromagnetic valve mounted on the base and connecting the master cylinder and the wheel brake;
   a reservoir mounted on the base;
   a second electromagnetic valve mounted on the base and connecting the wheel brake and the reservoir;
   a damper mounted on the base and connected to the master cylinder;
   a cover attached to the base and having a surface, said surface having a downwardly extending rim extending about an edge of said surface and being positioned about an outermost periphery of said base such that said surface covers an entire portion of the first and second electromagnetic valves, the reservoir and the damper, and said downwardly extending rim is positioned proximate to but not over any of the first and second electromagnetic valves, the reservoir and the damper, the rim including a seal groove;
   a sealing member fitted to the seal groove for elastically contacting the outermost periphery surface of the base; and
   a stopper member for securing each of said first electromagnetic valve and said second electromagnetic valve to said base.

2. The brake hydraulic controller of claim 1, wherein the cover comprises a synthetic resin and the seal groove has a substantially U-shaped cross-section including an inner closed surface and a pair of side surfaces connected to the inner closed surface substantially at right angles, in which the cover includes a reinforcing member made of rigid material, the reinforcing member comprising at least one of the inner closed surface and the side surfaces.

3. The brake hydraulic controller of claim 2, wherein the reinforcing member is positioned within the synthetic resin of the cover.

4. The brake hydraulic controller of claim 1, further comprising a return pump, mounted on the base, for returning hydraulic fluid from the reservoir to the master cylinder.

5. The brake hydraulic controller of claim 1, wherein, during a first operating state, the first electromagnetic valve is open and the second electromagnetic valve is closed.

6. The brake hydraulic controller of claim 1, wherein said cover, said sealing member and said base form a water-tight compartment for said first electromagnetic valve, said reservoir, said second electromagnetic valve and said damper.

7. The brake hydraulic controller of claim 6, wherein said reservoir includes a piston and said water-tight compartment has a size for causing a pressure condition to permit said piston to move freely within said reservoir.

8. The brake hydraulic controller of claim 1, further comprising:
   a plurality of said first electromagnetic valves;
   a plurality of said reservoirs;
   a plurality of said second electromagnetic valves; and
   a plurality of said dampers,
   wherein said cover, said sealing member and said base form a water-tight compartment for said plurality of first electromagnetic valves, said plurality of reservoirs, said plurality of second electromagnetic valves and said plurality of dampers.

9. A brake hydraulic controller as in claim 1 wherein said surface of said cover attached to the base completely covers the first and second electromagnetic valves, the reservoir and the damper.

10. The brake hydraulic controller of claim 1, where all of said first electromagnetic valve, said second electromagnetic valve, said reservoir and said damper are respectively secured to said base by said stopper member.

11. A brake hydraulic controller for controlling a hydraulic pressure from a master cylinder for operating a wheel brake, comprising:
   a base;
   a first electromagnetic valve mounted on the base and connecting the master cylinder and the wheel brake;
   a reservoir mounted on the base;
   a second electromagnetic valve mounted on the base and connecting the wheel brake and the reservoir;
   a damper mounted on the base and connected to the master cylinder;
   a cover attached to the base and having a surface covering the first and second electromagnetic valves, the reservoir and the damper, the cover including a seal groove; and
   a sealing member fitted to the seal groove for elastically contacting the surface of the cover,
   wherein the cover comprises a synthetic resin and the seal groove has a substantially U-shaped cross-section including an inner closed surface and a pair of side surfaces connected to the inner closed surface substantially at right angles, in which the cover includes a reinforcing member made of rigid material, the reinforcing member comprising at least one of the inner closed surface and the side surfaces,
   wherein the reinforcing member is positioned within the synthetic resin of the cover,
   wherein the reinforcing member includes an integrally formed cylindrical portion,
   said brake hydraulic controller further including a fastening bolt having a head for fitting through the cylindrical portion and being connected to the base,
   the cylindrical portion including a first end for contacting the surface of the base and a second end for engaging said head of the fastening bolt.

12. A brake hydraulic controller for controlling a hydraulic pressure from a master cylinder for operating a wheel brake, comprising:

a base;

a first electromagnetic valve mounted on the base and connecting the master cylinder and the wheel brake;

a reservoir mounted on the base;

a second electromagnetic valve mounted on the base and connecting the wheel brake and the reservoir;

a damper mounted on the base and connected to the master cylinder;

a cover attached to the base and having a surface covering the first and second electromagnetic valves, the reservoir and the damper, the cover including a seal groove; and a sealing member fitted to the seal groove for elastically contacting the surface of the cover, wherein the cover includes a notch and a grommet positioned within the notch.

13. The brake hydraulic controller of claim 12, wherein the grommet includes a groove for accommodating the sealing member.

14. The brake hydraulic controller of claim 12, wherein the grommet is integral with the sealing member.

15. The brake hydraulic controller of claim 12, further comprising a wiring harness positioned within said grommet.

16. A brake hydraulic controller for controlling hydraulic pressure from a master cylinder for operating a wheel brake, comprising:

a base;

a first electromagnetic valve mounted on the base and connecting the master cylinder and the wheel brake;

a reservoir mounted on the base;

a second electromagnetic valve mounted on the base and connecting the wheel brake and the reservoir;

a damper mounted on the base and connected to the master cylinder;

a cover attached to the base and having a surface, said surface having a downwardly extending rim extending about an edge of said surface and being positioned about an outermost periphery of said base such that said surface covers an entire portion of the first and second electromagnetic valves, the reservoir and the damper, and said downwardly extending rim is positioned proximate to but not over any of the first and second electromagnetic valves, the reservoir and the damper, the rim including a seal groove, said cover further includes mounting holes for attaching said cover to said base and means for maintaining a shape of said groove and a shape of said mounting holes; and a sealing member fitted to the seal groove for elastically contacting the outermost periphery surface of the base.

17. The brake hydraulic controller of claim 16, wherein said maintaining means comprises a rigid reinforcing member positioned within a surface of said cover.

18. The brake hydraulic controller of claim 17, wherein said cover comprises a single, continuous, integral surface.

19. The brake hydraulic controller of claim 17, wherein said cover comprises a unitary structure.

20. The brake hydraulic controller of claim 16, wherein said maintaining means comprises a rigid member having a first portion adjacent said mounting holes, said first portion having a cylindrical cross-section, and a second portion adjacent said sealing member.

21. The brake hydraulic controller of claim 16, wherein said maintaining means maintains contact between said sealing member and said base.

22. A brake hydraulic controller for controlling hydraulic pressure from a master cylinder for operating a wheel brake, comprising:

a base;

a first electromagnetic valve mounted on the base and connecting the master cylinder and the wheel brake;

a reservoir mounted on the base;

a second electromagnetic valve mounted on the base and connecting the wheel brake and the reservoir;

a damper mounted on the base and connected to the master cylinder;

a cover attached to the base and having a surface, said surface having a downwardly extending rim extending about an edge of said surface and being positioned about an outermost periphery of said base such that said surface covers an entire portion of the first and second electromagnetic valves, the reservoir and the damper, and said downwardly extending rim is positioned proximate to but not over any of the first and second electromagnetic valves, the reservoir and the damper, the rim including a seal groove, wherein said downwardly extending rim further includes inwardly curved surfaces, and arms extending from said inwardly curved surfaces that are positioned external to the sealing groove and proximate to but not over any of the first and second electromagnetic valves, the reservoir and the damper, the arms include a mounting hole adapted for mounting the cover to the base; and a sealing member fitted to the seal groove for elastically contacting the outermost periphery surface of the base.

23. A brake hydraulic controller for controlling hydraulic pressure from a master cylinder for operating a wheel brake, comprising:

a base;

at least one component mounted on the base;

a cover attached to the base and having a surface, the surface having a downwardly extending rim extending about an edge of the surface and being positioned about an outermost periphery of the base such that the surface covers the at least one component and the downwardly extending rim is positioned proximate to but not over the at least one component;

a sealing groove provided on the downwardly extending rim; and a seal member fitted to the sealing groove for elastically contacting the outermost periphery surface of the base; and a stopper member for securing at least one of the at least one component to the base.

24. The brake hydraulic controller of claim 23, wherein the at least one component includes:

a first electromagnetic valve mounted on the base and connecting the master cylinder and the wheel brake;

a reservoir mounted on the base;

a second electromagnetic valve mounted on the base and connecting the wheel brake and the reservoir; and a damper mounted on the base and connected to the master cylinder, and wherein the surface of the cover covers an entire portion of the first and second electromagnetic valves, the reservoir and the damper, and the downwardly extending rim is positioned proximate to but not over any of the first and second electromagnetic valves, the reservoir and the damper.

25. The brake hydraulic controller of claim 24, further comprising a stopper member for securing each of the first electromagnetic valve and the second electromagnetic valve to the base.

26. The brake hydraulic controller of claim 23, wherein:
- the at least one component includes check valves and return pumps all mounted on the base; and
- the surface of the cover covers an entire portion of the check valves and return pumps, and the downwardly extending rim is positioned proximate to but not over any of the check valves and return pumps.

27. A brake hydraulic controller for controlling hydraulic pressure from a master cylinder for operating a wheel brake, comprising:
- a base;
- at least one component mounted on the base;
- a cover attached to the base and having a surface, the surface having a downwardly extending rim extending about an edge of the surface and being positioned about an outermost periphery of the base such that the surface covers the at least one component and the downwardly extending rim is positioned proximate to but not over the at least one component;
- a sealing groove provided on the downwardly extending rim;
- a seal member fitted to the sealing groove for elastically contacting the outermost periphery surface of the base;
- mounting holes for attaching the cover to the base; and
- means for maintaining a shape of the groove and a shape of the mounting holes.

28. The brake hydraulic controller of claim 27, wherein the cover comprises a synthetic resin and the sealing groove has a substantially U-shaped cross-section including an inner closed surface and a pair of side surfaces connected to the inner closed surface substantially at right angles.

29. The brake hydraulic controller of claim 28, further comprising a stopper member for securing at least one of the at least one component to the base.

30. A brake hydraulic controller for controlling hydraulic pressure from a master cylinder for operating a wheel brake, comprising:
- a base having components mounted thereon;
- a cover attached to the base and having a surface, the surface having a downwardly extending rim extending about an edge of the surface and being positioned about an outermost periphery of the base such that the surface covers an entire portion of the components and the downwardly extending rim is positioned proximate to but not over any of the components, the downwardly extending rim including a sealing groove, inwardly curved surface, and arms extending from the inwardly curved surface that are positioned external to the sealing groove and proximate to but not over any of the components, the arms including a mounting hole adapted for mounting the cover to the base; and
- a seal member fitted to the seal groove for elastically contacting the outermost periphery surface of the base.

31. The brake hydraulic controller of claim 30, further comprising a stopper member for securely mounting at least one of the components to the base.

\* \* \* \* \*